US005725837A

United States Patent [19]

Turunen

[11] Patent Number: 5,725,837
[45] Date of Patent: Mar. 10, 1998

[54] PROCESS FOR THE PREPARATION OF HYDROGEN PEROXIDE

[75] Inventor: Ilkka Turunen, Oulu, Finland

[73] Assignee: Kemira Chemicals Oy, Helsinki, Finland

[21] Appl. No.: 598,819

[22] Filed: Feb. 9, 1996

[30] Foreign Application Priority Data

Feb. 10, 1995 [FI] Finland ............................ 950582

[51] Int. Cl.$^6$ ...................................... C01B 15/023
[52] U.S. Cl. ........................................... 423/588
[58] Field of Search ........................ 423/588, 589, 423/590

[56] References Cited

U.S. PATENT DOCUMENTS

| | | | |
|---|---|---|---|
| 2,993,760 | 9/1961 | Broun, Jr. et al. ............ | 423/588 |
| 3,321,279 | 5/1967 | Williams ........................ | 423/588 |
| 3,880,596 | 4/1975 | Liebert et al. ................. | 23/283 |
| 5,196,179 | 3/1993 | Turunen et al. ............... | 423/588 |

FOREIGN PATENT DOCUMENTS 82920  4/1995  Finland.

OTHER PUBLICATIONS

Perry et al. (eds.), *Perry's Chemical Enginees' Handbook*, McGraw–Hill Book Co., 1984, pp.19–23.
*Ullmann's Encyclopedia of Industrial Chemistry*, 5th ed., vol. A13, 1995, pp. 447–456.

*Primary Examiner*—Wayne Langel
*Attorney, Agent, or Firm*—Seed and Berry LLP

[57] ABSTRACT

The invention relates to a process for the preparation of hydrogen peroxide by the anthraquinone process, comprising the oxidation of a hydrogenated organic working solution for the formation of hydrogen peroxide and the extraction of the hydrogen peroxide into an aqueous phase, the oxidation and the extraction being carried out in the same space by directing into one and the same reactor (1) a hydrogenated organic working solution, an oxygen-containing gas and an aqueous extraction solvent in order to form a mixture of three phases, i.e., an organic phase, a gas phase and an aqueous phase, whereby the dissolving of the oxygen in the working solution and the oxidation reaction in the working solution, as well as the transfer of the hydrogen peroxide to the aqueous phase are achieved, whereafter the product leaving the reactor is subjected to phase separation (2) for the recovery of an aqueous solution of hydrogen peroxide. The invention also relates to the use of this process in parallel with a conventional process for the preparation of hydrogen peroxide.

8 Claims, 3 Drawing Sheets

PROCESS FOR THE PREPARATION OF HYDROGEN PEROXIDE

TECHNICAL FIELD

The present invention relates to the preparation of hydrogen peroxide by the anthraquinone process.

BACKGROUND OF THE INVENTION

The conventional anthraquinone process is based on alternating hydrogenation and oxidation of anthraquinone derivatives, usually alkylanthraquinones. In the process the alkylanthraquinones are present dissolved in a solvent made up of a plurality of organic substances. This solution, which is called the working solution, circulates continuously through the most important steps of the process. In the hydrogenation step the alkylanthraquinones are hydrogenated catalytically to alkylanthrahydroquinones.

In the subsequent step, oxidation, the alkylanthrahydroquinones react with oxygen, whereby they return to their original form, i.e., alkylanthraquinones. At the same time, hydrogen peroxide is formed. The oxidation is followed by extraction, wherein the hydrogen peroxide dissolved in the working solution is extracted from it with water. Thus an aqueous solution of hydrogen peroxide is obtained. The extracted working solution is dried of excess water and is recycled to the beginning of the cycle process, i.e., to hydrogenation. The aqueous solution of hydrogen peroxide is purified and concentrated.

Patent application FI-894502 discloses an oxidation reactor wherein a mixture of oxygen and anthraquinone is caused to flow cocurrently through a tubular reactor. The reactor is made up of a vertical or horizontal tube which contains a static mixer made up of one or several parts. U.S. Pat. No. 3,880,596 proposes that the oxidation be carried out in a column made up of a plurality of sections, air or some other oxygen-containing gas flowing upwards through the entire column. The working solution flows in the same direction, but first through the topmost column section, thereafter through the section next to the top, and last through the lowest column. Thus the sections of the column operate cocurrently but the entire column, in a way, operates countercurrently.

One state-of-the-art extraction apparatus, a sieve-tray column (BASF), is described, for example, in Ullmann's Encyclopedia of Industrial Chemistry, 5th ed., Vol. A13, pages 455–456.

In all previously known anthraquinone processes, the oxidation reaction and the extraction take place in separate steps, and thus also in separate vessels. The oxidation reaction, in which anthrahydroquinone derivatives react with oxygen, forming hydrogen peroxide and anthraquinone derivatives, takes place in the oxidation reactor. From this reactor the organic working solution, which contains dissolved hydrogen peroxide, is directed to another vessel, wherein the hydrogen peroxide is removed by extracting it with water. In the oxidation reactor there are two phases, an organic working solution and an oxygen-containing gas phase. In the extraction vessel there are two liquid phases, an organic solution and an aqueous phase. Two phenomena essential for the process occur in the oxidation reactor, namely the dissolving of oxygen in the organic working solution and the oxidation reaction in the working solution. The key phenomenon occurring in the extraction vessel is the passing of the hydrogen peroxide from the working solution to the aqueous phase.

The state-of-the-art hydrogen peroxide process is characterized in that the process is a multiple-step process. Each step requires its own principal vessel in the process. The extraction columns are quite sizable, a typical diameter of the filter-tray column is 2–3 m and the total height 10–20 m. The oxidation reactor is in general even larger when it is question of a column-type reactor, as in the U.S. patent mentioned above. The construction of a plant preparing hydrogen peroxide, or the extension of a plant already in operation, thus requires large investments. There is need in the art for the simplification of the process in order to reduce the investment costs.

SUMMARY OF THE INVENTION

An object of the present invention is to simplify the process currently in use for the preparation of hydrogen peroxide, thereby reducing investment cost for plant construction. Another important object is to provide a process by means of which the capacity of a plant already in operation can be increased in an advantageous manner. A further object is a process which enables aqueous hydrogen peroxide solutions of various concentrations to be prepared. One further object is to increase the safety of the process currently in use. These objects can be achieved by means of the present invention, the main characteristics of which are given in the accompanying specification, figures and claims.

The present invention relates primarily to a process for the preparation of hydrogen peroxide by the anthraquinone process, comprising the oxidation of a hydrogenated working solution for the formation of hydrogen peroxide and the extraction of hydrogen peroxide into an aqueous phase, as well as the recovery of the aqueous hydrogen peroxide solution, the process being characterized in that the oxidation and the extraction are carried out in the same space by feeding into the same reactor a hydrogenated organic working solution, an oxygen-containing gas and an aqueous extraction solvent in order to form a mixture of three phases, i.e., an organic phase, a gas phase and an aqueous phase, whereby the dissolving of oxygen in the working solution and the oxidation reaction in the working solution, as well as the transfer of the hydrogen peroxide to the aqueous phase, are achieved, whereafter the product leaving the reactor is subjected to phase separation for the recovery of an aqueous solution of hydrogen peroxide.

DETAILED DESCRIPTION OF THE INVENTION

Figure 1:
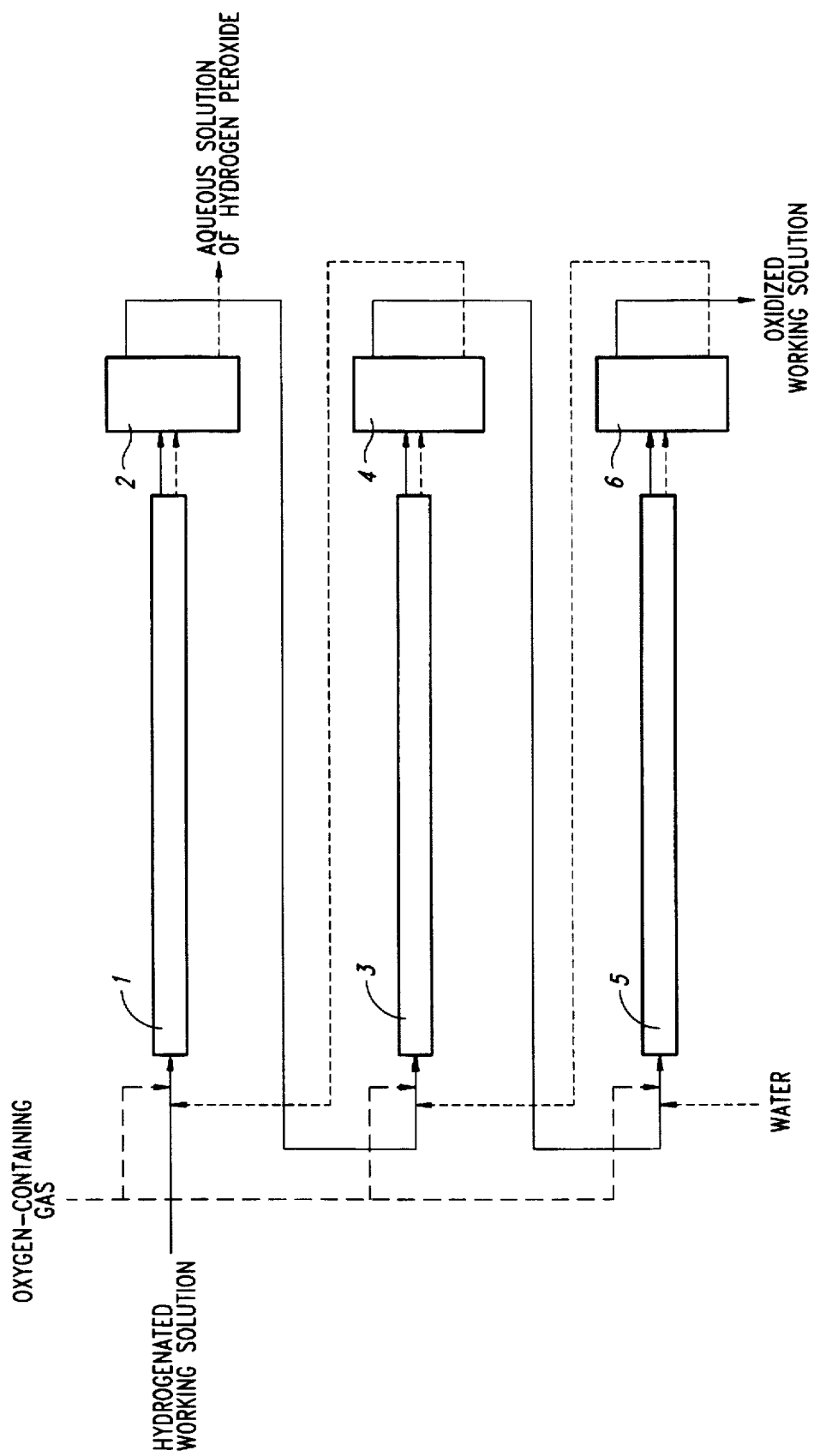
FIG. 1 depicts diagrammatically the use of the process according to the invention for the preparation of hydrogen peroxide.

In the present invention the process for the preparation of hydrogen peroxide has been simplified so that the oxidation and the extraction take place in the same step and in the same apparatus. The working solution, the oxygen-containing gas and the aqueous phase are present as a mixture of three phases in this apparatus. All the three key phenomena, i.e., the dissolving of oxygen in the working solution, the oxidation reaction in the solution, and the transfer of the hydrogen peroxide to the aqueous phase, also take place in this same apparatus.

It is surprising that the oxidation and the extraction do not hamper each other and can be carried out in the same space. In the experiments performed it was observed, surprisingly, that the presence of the aqueous phase in the reaction reduces the conversion of oxidation only to the extent that the volume available for the reaction is reduced owing to the aqueous phase. Furthermore, it seemed that the presence of the oxidation gas in the reactor even promoted the transfer of hydrogen peroxide to the aqueous phase. This is possibly explainable on the basis of the mixing phenomenon caused by the gas.

As a consequence of the invention, the number of principal vessels in the process is lowered and thereby the investment costs are reduced. The amount of working solution circulating in the process is also reduced, a factor which for its part affects investment costs and reduces the fire load.

The reactor in which oxidation and extraction are carried out simultaneously may be, for example, a tubular reactor in which all the three phases flow cocurrently. The tubular reactor may contain static mixers by means of which sufficient mixing and dispersion are achieved. By static mixers are meant, for example, devices described in Perry's Chemical Engineers' Handbook, 6th edition, pages 19–22 and 19–23. Dispersion is needed for rendering the interfaces between the phases sufficiently large. The size of the interface affects the rate at which the dissolving of oxygen and the transfer of hydrogen peroxide from one liquid to another take place.

The system described in the preceding paragraph, in which the phases flow in the same direction in the tube, is not necessarily advantageous in terms of extraction. The hydrogen peroxide extraction step must fulfill two objectives: nearly all of the hydrogen peroxide should be extracted from the organic working solution, and on the other hand the extract, i.e., the aqueous phase, should obtain as high a hydrogen peroxide concentration as possible. A countercurrent extraction apparatus is capable of carrying out such a function considerably better than the proposed cocurrent apparatus. The disadvantages of a cocurrent apparatus can in this sense be reduced by constructing the apparatus so that the tubular reactor is made up of a plurality of sections between which the phases are separated from each other. Although in individual reactor sections the phases travel cocurrently, the apparatus as a whole operates countercurrently with respect to the liquid phases.

Thus, according to one preferred embodiment of the invention, the oxidation and the extraction are carried out in a tubular reactor made up of a plurality of sections between which the phases are separated from each other, and the organic phase separated between the said sections in each given case is directed to the subsequent section. An oxygen-containing gas and an aqueous extraction solvent and/or an aqueous solution of hydrogen peroxide obtained from the phase separation after the subsequent section are fed into each section of the tubular reactor, one or several aqueous hydrogen peroxide solutions obtained from phase separation being recovered.

According to one embodiment, an aqueous extraction solvent is fed into the last section of the tubular reactor, and into the other sections of the tubular reactor there is fed an aqueous hydrogen peroxide solution obtained from the phase separation after the section subsequent in each given case, an aqueous solution of hydrogen peroxide being recovered from the phase separation between the first section and the second section of the tubular reactor.

According to another embodiment, an aqueous extraction solvent is fed into the last section and at least one other section of the tubular reactor, and into the other sections of the tubular reactor there is fed the aqueous solution obtained from the phase separation after the section subsequent in each given case, and thus aqueous solutions having different concentrations of hydrogen peroxide can be recovered from the process.

The oxygen-containing gas mentioned above is preferably oxygen, but also other oxygen-containing gases, such as oxygen-enriched air, can be used.

The aqueous extraction solvent referred to above is preferably water.

By the process according to the invention it is possible to produce a situation in which the oxidation reaction can be caused to take place more completely than in conventional oxidation reactors. The oxidation reaction of anthrahydroquinone can be illustrated by the following reaction equation

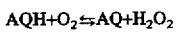

$$AQH+O_2 \rightleftharpoons AQ+H_2O_2$$

where AQH is anthrahydroquinone and AQ is anthraquinone. It is known that the reaction is very difficult to carry out to completion. A portion of the anthrahydroquinone remains unoxidized. In some conditions the conversion may remain considerably incomplete, for example when the concentration of oxygen in the gas is low. In the process according to the invention, hydrogen peroxide is withdrawn by extraction, and thus hydrogen peroxide is removed from the phase in which the reaction takes place. Thus, if the reaction has an equilibrium, the equilibrium will shift to the right in the above reaction, and the reaction will better be carried out to completion. Thus, by the process according to the invention the equilibrium is possibly shifted so that the oxidation reaction will take place to completion.

The invention also relates to the use of the process according to the invention in parallel with a conventional hydrogen peroxide process which comprises a separate oxidation step and a separate extraction step, in which case a portion of the hydrogenated organic working solution is treated in accordance with the said conventional method and a portion in accordance with the method according to the invention, and the aqueous hydrogen peroxide solution produced by the latter process is directed to a suitable point of the extraction step of the said conventional process. By this system it is possible, in a simple manner, to increase the capacity of a hydrogen peroxide process already in operation.

Referring now to the figures, FIG. 1 shows a reactor made up of three successive sections. There may just as well be any other number of sections. Each section is made up of a tubular reactor and a phase separator. Thus the reactor in FIG. 1 is made up of a first, a second, and a third tubular reactor and of corresponding phase separators. The tubular reactors are indicated by reference numerals 1, 3 and 5, and the phase separators respectively by 2, 4 and 6. The three phases flow as follows.

The organic phase, i.e., the working solution, is indicated by a solid line. The hydrogenated organic working solution is directed through the first tubular reactor 1 (in FIG. 1 from the left to the right) to the first phase separator 2, thereafter through the second tubular reactor 3 and the second phase separator 4, and finally through the third tubular reactor 5 and phase separator 6. An oxidized working solution, dilute with respect to hydrogen peroxide, is thus obtained from the third phase separator 6.

The aqueous phase is depicted with a dotted line. Pure water is fed through the last, i.e., the third, tubular reactor 5 and the corresponding phase separator 6, thereafter the water is directed through the second tubular reactor 3 to the second phase separator 4, and finally through the first tubular reactor 1 to the first phase separator 2. From the first phase separator 2 there is thus obtained a product which is an aqueous solution of hydrogen peroxide.

The oxygen-containing gas, i.e., the oxidation gas, is depicted by a dot-dash line. The oxidation gas used is oxygen, but, for example, enriched air can also be used. Oxidation gas is fed into each tubular reactor along with the other phases.

In each phase separator, all the three phases are separated from each other. A phase separator shown as one block in FIG. 1 may in reality be made up of two successive phase separators, in one of which the gases are separated from the liquid and in the other the two liquid phases are separated from each other.

The flows are arranged so that, although the liquids have been arranged to flow cocurrently in the tubular reactor, in terms of the whole the liquid flows take place in opposite directions. By this countercurrent arrangement the advantage is gained that a higher concentration is achieved than by using totally coeurrent arrangement.

Figure 2:
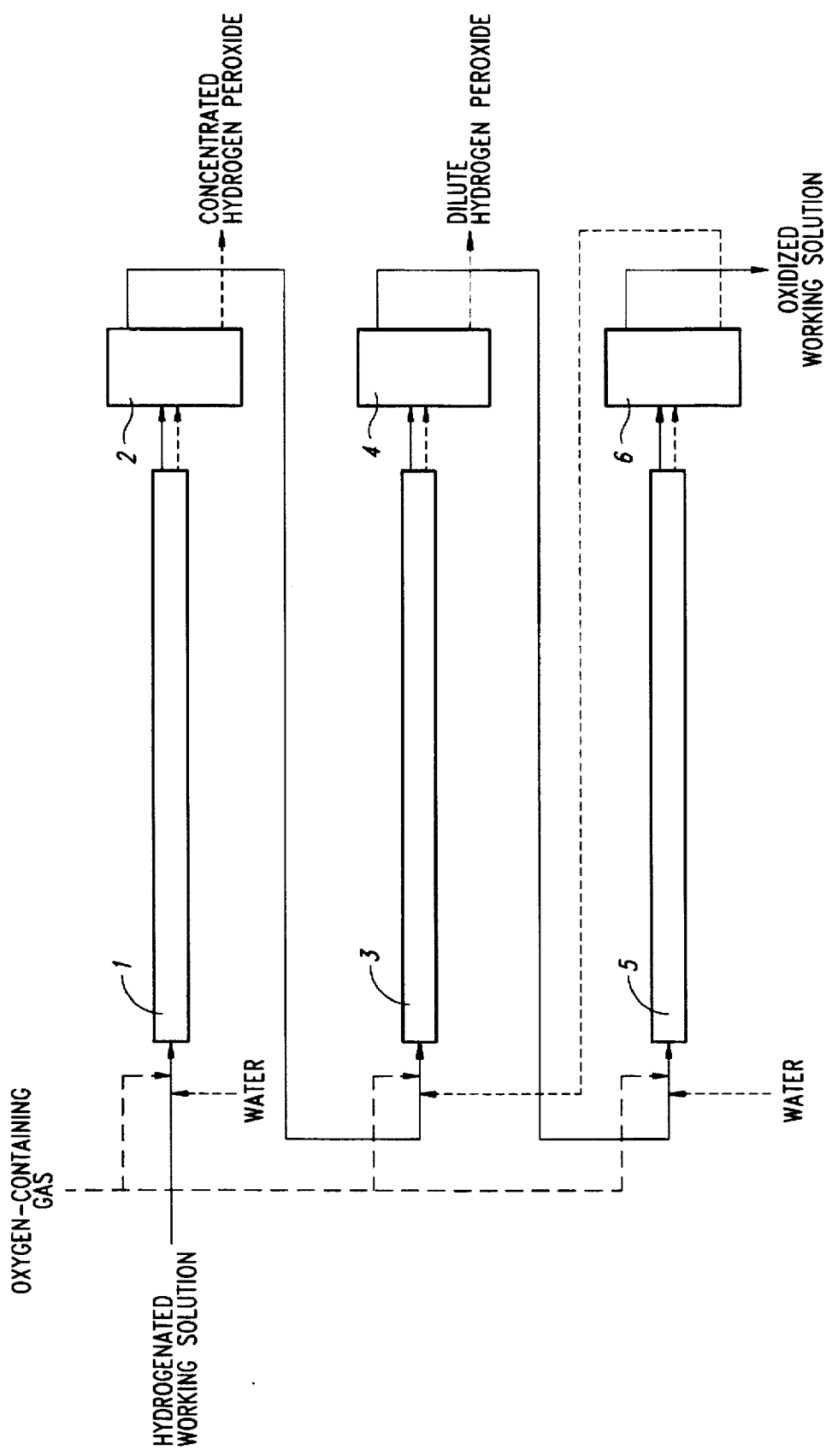
FIG. 2 depicts diagrammatically the use of the process according to the invention for the preparation of hydrogen peroxide solutions with different hydrogen peroxide concentrations.

FIG. 2 shows an arrangement in which the circulation of the organic phase and the feeding in of the oxidation gas take place in the same manner as in FIG. 1, but which has two separate water feeds. In the first tubular reactor 1 in FIG. 2, a concentrated hydrogen peroxide is prepared. A hydrogenated working solution is introduced into the tubular reactor 1. Extraction water is fed into the same tubular reactor 1. By selecting a sufficiently low flow rate for the extraction water, it is possible to prepare directly by extraction an aqueous hydrogen peroxide solution having a high concentration, up to 50%. When the low-rate water flow comes into contact with the concentrated working solution, a concentrated hydrogen peroxide solution is obtained. The concentrated hydrogen peroxide solution is withdrawn from phase separator 2. In the lower tubular reactors 3 and 5 there circulates a larger amount of water, by means of which the rest of the hydrogen peroxide is recovered into a more dilute solution, which is withdrawn from the second phase separator 4.

Figure 3:
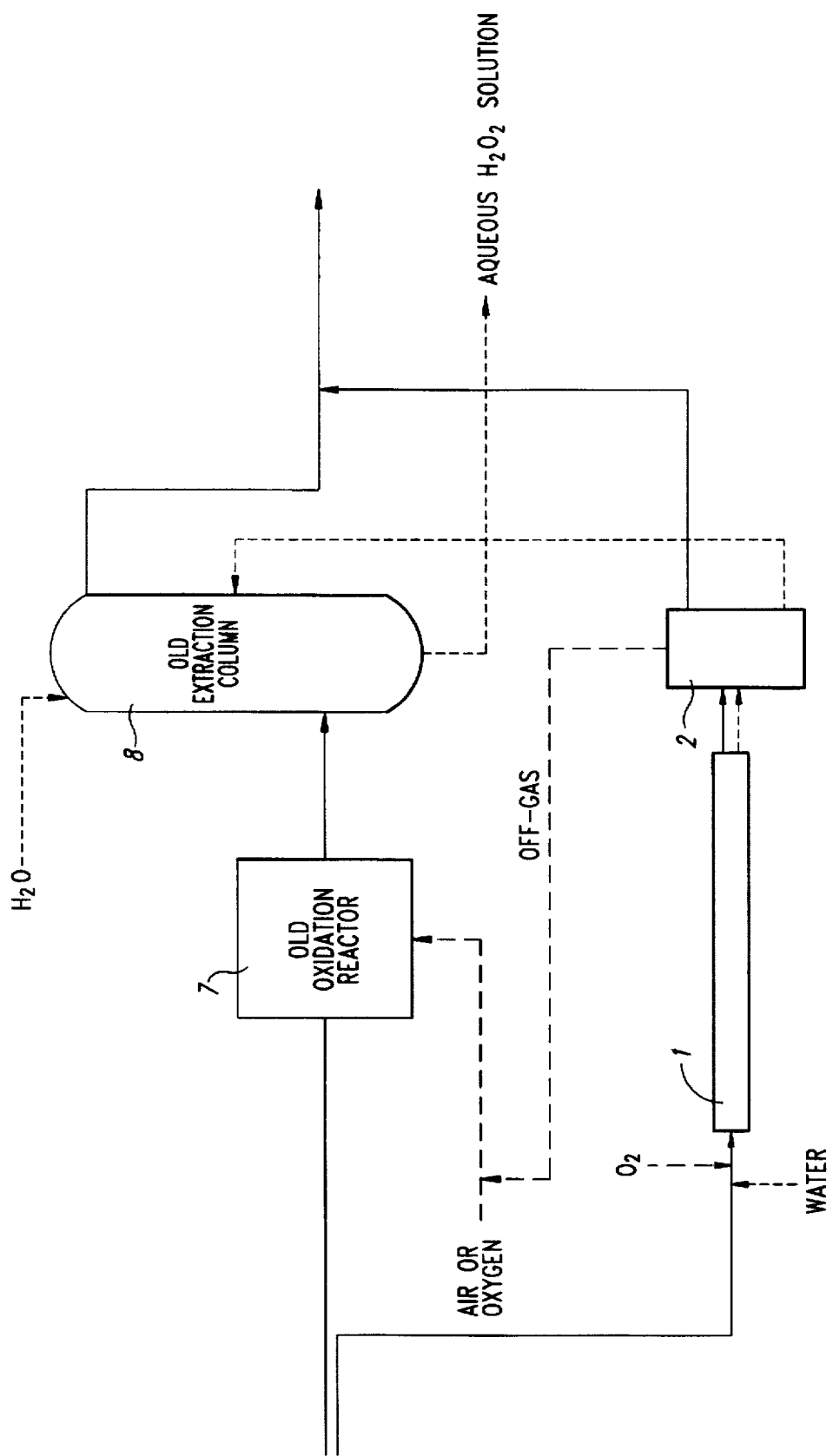
FIG. 3 depicts diagrammatically the use of the process according to the invention for increasing the capacity of a conventional hydrogen peroxide process.

FIG. 3 illustrates how the invention can be used for increasing the capacity of a conventional hydrogen peroxide process. This is done by increasing the circulation of the working solution and by adding, alongside the old oxidation reactor 7 and the old extraction column 8, a small tubular reactor 1 and phase separator 2 according to the invention. The additional amount of working solution is passed through the new tubular reactor 1. The working solution coming from the phase separator 2 joins the working solution circulation at a point after the old extraction column 8. Oxygen is fed into the tubular reactor 1 so that all of the anthrahydroquinone is oxidized. The off-gas obtained from the phase separator 2 is added to the feed gas of the old oxidation reactor 7. Thereby the advantage is gained that, by using a large excess of oxygen, the oxidation in its entirety can be carried out in a short reactor. The excess oxygen is not wasted; it can be used in the old oxidation reactor 7. Also, a large amount of water is used in the tubular reactor 1 to extract all of the hydrogen peroxide. From this it follows that the aqueous hydrogen peroxide solution obtained from the phase separator 2 is rather dilute with respect to hydrogen peroxide. However, this is not a disadvantage, since the aqueous phase is fed into the old extraction column 8 at the point at which an aqueous phase of the same concentration is present in the extraction column.

Finnish patent application Ser. No. 950582 filed Feb 10, 1995 is hereby incorporated by reference in its entirety.

EXAMPLE

The process according to the invention was subjected to experimentation in a tubular reactor having a length of 12 m and an inner diameter of 28.5 mm. Inside the reactor there were static mixers. At the downstream end of the tubular reactor there were installed two phase separators; in the first of them the gas was separated from the liquids and in the second the aqueous phase and the organic liquid were separated from each other.

The apparatus was used for trial runs in which an anthrahydroquinone-containing working solution, oxygen, and water were fed into the reactor. The experiments were performed in a continuous-working manner, varying the anthraquinone concentration, the pressure, and the flow rates of all the three phases.

In one experiment, a working solution containing anthrahydroquinones in an amount of approximately 8 percent by weight was fed at a rate of 1.2 $m^3$/h into the reactor. At the same time water was fed in at a rate of 11.4 $m^3$/h and oxygen at 1.93 $Nm^3$/h. The pressure at the upstream end of the reactor was 4 bar and the temperature approximately 50° C. The aqueous phase leaving the reactor contained hydrogen peroxide 12.1 percent by weight.

The invention is not limited to the embodiments described above; it may be varied within the limits defined in the accompanying claims. Thus, for example, the reactor in which the oxidation and extraction take place simultaneously need not be a tubular reactor; it may also be some other reactor, for example a mixing tank. The reactor must have enough mixing and dispersion so that a sufficient interface between the phases is obtained. Sufficient interface is required between the oxygen gas and the organic working solution, as also between the aqueous phase the working solution, so that the phenomena of transfer of material will have time to take place.

The tubular reactors are preferably in a horizontal position, but for example reactors in a vertical position are also possible. The tubular reactors may differ from each other in structure; for example, the diameters may be of different magnitudes.

I claim:

1. In a process for the preparation of hydrogen peroxide by the anthraquinone method, comprising oxidation of a hydrogenated organic working solution to form hydrogen peroxide, extraction of the hydrogen peroxide into an aqueous phase, and recovery of an aqueous solution of hydrogen peroxide, the improvement comprising carrying out both the oxidation and the extraction in a single reactor having three phases flowing cocurrently which form a mixture, wherein the three phases are an organic phase comprising the hydrogenated organic working solution, a gas phase comprising an oxygen-containing gas, and an aqueous phase comprising an aqueous extraction solvent, whereby oxygen dissolves in the working solution, the working solution is oxidized, and hydrogen peroxide is transferred from the working solution to the aqueous phase to form an aqueous hydrogen peroxide solution; and thereafter subjecting the mixture leaving the reactor to phase separation for recovery of the aqueous hydrogen peroxide solution.

2. The process according to claim 1 wherein the oxidation and the extraction are carried out in a tubular reactor.

3. The process according to any one of claims 1 and 2 wherein the oxidation and the extraction are carried out in a tubular reactor which is formed of a plurality of sections; the three phases are separated from each other between the sections; and the organic phase separated between any two sections is directed to a subsequent section.

4. The process according to claim 3 wherein an oxygen-containing gas and at least one of an aqueous extraction solvent and an aqueous hydrogen peroxide solution obtained from phase separation which follows the subsequent section: are fed into each section of the tubular reactor, and one or more aqueous hydrogen peroxide solutions are recovered after phase separation.

5. The process according to claim 4 wherein into the last section of the tubular reactor there is fed the aqueous extraction solvent, and into all sections other than the last section of the tubular reactor there is fed the aqueous hydrogen peroxide solution obtained from phase separation after the section subsequent in each given case, and the aqueous hydrogen peroxide solution is recovered from phase separation between the first two sections of the tubular reactor.

6. The process according to claim 4 wherein into the last section and at least one other section of the tubular reactor there is fed the aqueous extraction solvent, and into the sections of the tubular reactor not receiving the aqueous extraction solvent there is fed the aqueous hydrogen peroxide solution obtained from phase separation after the section subsequent in each given case, and recoverable aqueous solutions having different concentrations of hydrogen peroxide are formed.

7. A process wherein a first hydrogen peroxide-forming process which comprises conducting an oxidation step and an extraction step in separate reactors, is run in parallel with a second hydrogen peroxide-forming process according to any one of claims 1-2 and 4-6, such that a portion of hydrogenated organic working solution is subjected to the oxidation step and the extraction step in separate reactors and a portion of hydrogenated organic working solution is treated in accordance with the process defined by any one of claims 1-2 and 4-6, and the aqueous hydrogen peroxide solution produced by the process defined by any one of claims 1-2 and 4-6 is used in the extraction step of the first process.

8. A process wherein a first hydrogen peroxide-forming process which comprises conducting an oxidation step and an extraction step in separate reactors, is run in parallel with a second hydrogen peroxide-forming process according to claim 3, such that a portion of hydrogenated organic working solution is subjected to the oxidation step and the extraction step in separate reactors and a portion of hydrogenated organic working solution is treated in accordance with the process defined by claim 3, and the aqueous hydrogen peroxide solution produced by the process of claim 3 is used in the extraction step of the first process.

* * * * *

UNITED STATES PATENT AND TRADEMARK OFFICE
CERTIFICATE OF CORRECTION

PATENT NO. : 5,725,837
DATED : March 10, 1998
INVENTOR(S) : Ilkka Turunen

It is certified that error appears in the above-identified patent and that said Letters Patent is hereby corrected as shown below:

Column 7, claim 4, line 8, after "section" delete : and insert -- , --.

Signed and Sealed this

Seventeenth Day of November, 1998

Attest:

BRUCE LEHMAN

Attesting Officer

Commissioner of Patents and Trademarks